(No Model.) 2 Sheets—Sheet 1.

A. SCHMID.
DISCHARGE DEVICE FOR ELECTRICAL MACHINES.

No. 405,124. Patented June 11, 1889.

WITNESSES:
George Brown Jr.
James M. Barr.

INVENTOR,
ALBERT SCHMID.
Charles A. Terry,
Att'y.

(No Model.) 2 Sheets—Sheet 2.

A. SCHMID.
DISCHARGE DEVICE FOR ELECTRICAL MACHINES.

No. 405,124. Patented June 11, 1889.

WITNESSES:
George Brown Jr.
James M. Barr

INVENTOR,
ALBERT SCHMID.

Att'y

UNITED STATES PATENT OFFICE.

ALBERT SCHMID, OF ALLEGHENY, ASSIGNOR TO THE WESTINGHOUSE ELECTRIC COMPANY, OF PITTSBURG, PENNSYLVANIA.

DISCHARGE DEVICE FOR ELECTRICAL MACHINES.

SPECIFICATION forming part of Letters Patent No. 405,124, dated June 11, 1889.

Application filed March 12, 1889. Serial No. 303,041. (No model.)

*To all whom it may concern:*

Be it known that I, ALBERT SCHMID, a citizen of the Republic of Switzerland, residing in Allegheny, county of Allegheny, and State of Pennsylvania, have invented a certain new and useful Improvement in Discharge Devices for Electrical Machines, (Case No. 270,) of which the following is a specification.

The invention relates to the construction of a device for preventing the occurrence of injurious disruptive electrical discharges between the coils of an armature of an electrical machine and the soft-iron core.

In operating dynamo-electric machines employing currents of very high potential it is found that the friction between the belt and belt-wheels tends to produce a high difference of potential between the body of the armature and the coils of the armature. There is established thus a tendency for a discharge to take place from the armature-body to the coils of the armature, especially when the same are connected with conductors extending over a considerable area. Very high insulation of mica and other insulating substances are sometimes pierced and destroyed by the discharges which take place in this manner.

The present invention has for its object to provide a device which may be applied to a belt-wheel of any desired size for the purpose of procuring a harmless discharge of the electricity generated by the friction between the belt and the belt-wheel, thus preventing the occurrence of a high difference of potential between the armature-core and its coils.

The invention will be described in detail in connection with the accompanying drawings, in which—

Figure 1:
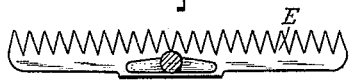
Figure 2:
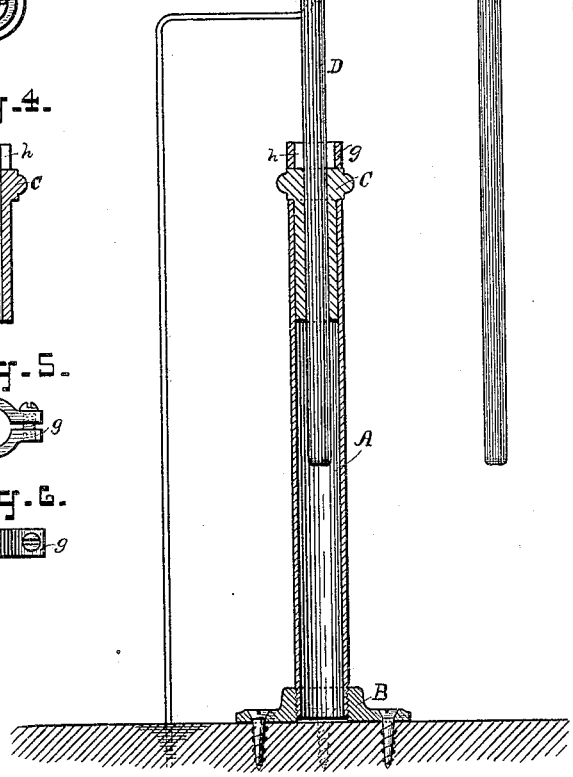
Figure 3:
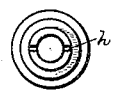
Figure 4:
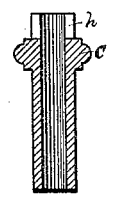
Figure 5:
Figure 6:
Figure 7:
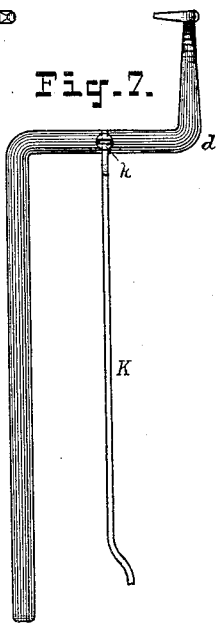
Figure 8:
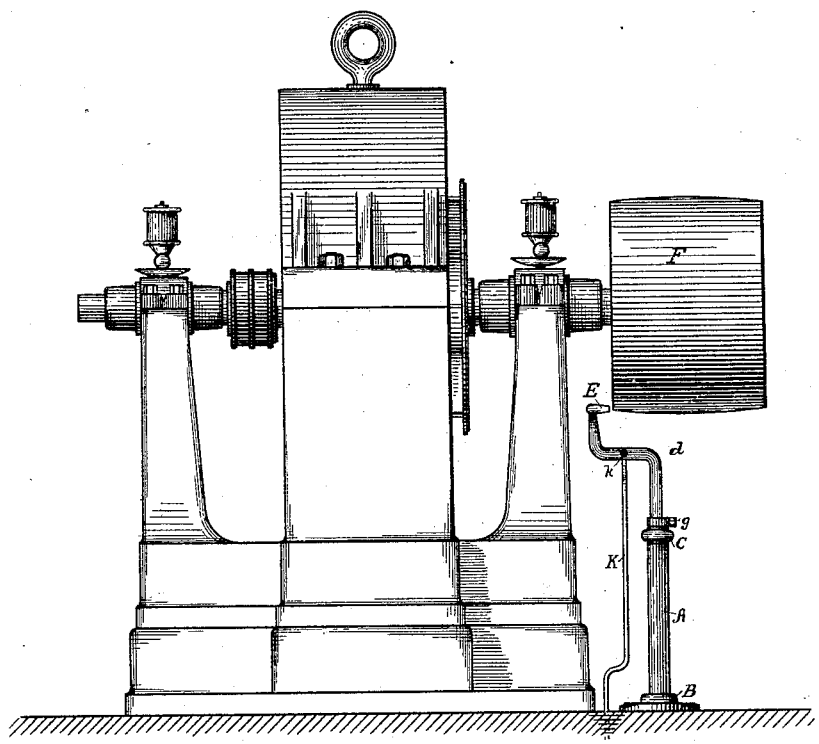

Figure 1 is a detailed view of a portion of the discharge device, and Fig. 2 is an elevation, partly in section, of the complete device; and Figs. 3, 4, 5, 6 and 7 illustrate the details of construction, and Fig. 8 illustrates the application of the invention to the belt-wheel of an alternating-current electric generator.

Referring to the figures, A represents a suitable standard, which may be secured to the floor or any other desired support by entering a base-plate B, screwed, bolted, or otherwise fastened to the support. Within the upper portion of the standard A there is inserted a tubular washer C, which may be, if desired, of non-conducting material. Through this there extends an adjustable rod D, carrying at the upper extremity the toothed discharge-plate E. This is bent into a horizontal plane, so that the teeth extend toward the edge of a belt-wheel F. (See Fig. 8.) The rod or arm D is constructed with an elbow $d$, which permits the standard B to be placed beneath the belt-wheel, while the plate E is carried at one side of the belt-wheel. The position of the plate E may be adjusted for the purpose for placing it opposite the edge of the belt-wheel, whatever be the size of the latter or its height from the ground. A collar $g$ (see Figs. 5 and 6) surrounds a slotted extension $h$ (see Figs. 2, 3, and 4) of the washer C, and by tightening this collar the extension may be pressed against the rod D, thus holding it in any desired position. After the position has been adjusted so as to bring the discharge-plate E opposite the belt-wheel a conductor K is connected with the rod D by means of a set-screw $k$, or in any other convenient manner, and this is electrically connected with the earth, the purpose being to allow the difference of potential to be neutralized by reason of the discharge which takes place through the points or teeth of the plate E.

By making the position of the plate E adjustable it is evident that the device is applicable to machines and belt-wheels of different sizes.

It is usually preferred to place the plate E between the belt-wheel and the body of the machine, as in that position it is less exposed to injury and less opportunity is offered for persons working about the machine to receive accidental shocks.

I claim as my invention—

1. The combination, with an electric machine, its belt-wheel and a belt applied thereto, of an adjustable discharge device consisting of a discharge-plate directed toward the belt-wheel, a support therefor, and means for adjusting the vertical position of such support.

2. The combination, with an electric machine, of a driving belt-wheel, and a discharge device consisting of a plate interposed between the body of the machine and the inner side of the belt-wheel.

3. The combination, with an electric machine, of a driving belt-wheel, and a discharge device consisting of a plate interposed between the body of the machine and the inner side of the belt-wheel, and electrical connections from the discharge device with the earth.

4. A discharge device for belt-wheels, consisting of a stationary support, a discharge-plate placed between the belt-wheel and the body of the machine, and an arm carrying the plate adjustable in said support.

5. An electrical-discharge device consisting of a stationary support, a rod adjustable therein, a discharge-plate carried by the rod, an electrical connection from the plate, and means for holding the rod in any desired vertical position.

6. In an electrical-discharge device, the combination of the tubular support A, the washer C, carried thereby, having a resilient extension $h$, the vertically-adjustable rod D, the plate E, carried by the rod, and the collar $g$ for compressing said extension.

In testimony whereof I have hereunto subscribed my name this 6th day of March, A. D. 1889.

ALBERT SCHMID.

Witnesses:
W. D. UPTEGRAFF,
CHARLES A. TERRY.